United States Patent
Ceccarelli et al.

(10) Patent No.: US 9,774,492 B2
(45) Date of Patent: Sep. 26, 2017

(54) MESSAGE PASSING TO ASSURE DELETION OF LABEL SWITCHED PATH

(75) Inventors: Daniele Ceccarelli, Genoa (IT); Diego Caviglia, Savona (IT); Francesco Fondelli, Calcinaia (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 381 days.

(21) Appl. No.: 13/992,945

(22) PCT Filed: Dec. 1, 2011

(86) PCT No.: PCT/EP2011/071477
§ 371 (c)(1),
(2), (4) Date: Aug. 2, 2013

(87) PCT Pub. No.: WO2012/079994
PCT Pub. Date: Jun. 21, 2012

(65) Prior Publication Data
US 2013/0301402 A1    Nov. 14, 2013

Related U.S. Application Data

(60) Provisional application No. 61/492,526, filed on Jun. 2, 2011.

(30) Foreign Application Priority Data

Dec. 15, 2010   (EP) .................................... 10195188

(51) Int. Cl.
*H04L 12/24* (2006.01)
*H04L 12/701* (2013.01)
(Continued)

(52) U.S. Cl.
CPC ......... *H04L 41/0654* (2013.01); *H04L 45/00* (2013.01); *H04L 45/28* (2013.01);
(Continued)

(58) Field of Classification Search
CPC ... H04L 41/0654; H04L 45/00; H04L 47/724; H04L 45/28; H04L 45/50; H04L 45/22
See application file for complete search history.

(56) References Cited

U.S. PATENT DOCUMENTS 7,039,005 B2 * 5/2006 Jenq et al. .................... 370/217
2004/0081085 A1 * 4/2004 De Cnodder et al. ........ 370/225
(Continued)

FOREIGN PATENT DOCUMENTS

| CN | 1477819 A | 2/2004 |
|---|---|---|
| CN | 1505409 A | 6/2004 |
| EP | 1 379 032 | 1/2004 |

OTHER PUBLICATIONS

International Search Report for PCT/EP2011/071477 mailed Dec. 27, 2011.
(Continued)

*Primary Examiner* — Brian D Nguyen
*Assistant Examiner* — Toan Nguyen
(74) *Attorney, Agent, or Firm* — Baker Botts, LLP (57) ABSTRACT

A label switched path through a network of nodes, is torn down by sending a message along the path from an ingress node. If there is a fault along the path, a path error message (2) is sent back along the path to the ingress node. The ingress node uses a different route bypassing the fault to alert (3) a further one of the nodes (NE5, NE6) on that path beyond the indicated fault, to cause that further node to continue the tearing down for other nodes on that path beyond the indicated fault by sending a further message (4) along the portion of the path beyond the indicated fault, to indicate to the other nodes to continue the tear down. This enables the ingress node to clean up the rest of the path beyond the fault, to avoid leaving unused capacity unavailable for reuse, and to avoid time consuming manual clean up.

13 Claims, 9 Drawing Sheets

(51) Int. Cl.
*H04L 12/703* (2013.01)
*H04L 12/707* (2013.01)
*H04L 12/723* (2013.01)
*H04L 12/913* (2013.01)

(52) U.S. Cl.
CPC .............. *H04L 45/22* (2013.01); *H04L 45/50* (2013.01); *H04L 47/724* (2013.01)

(56) References Cited

U.S. PATENT DOCUMENTS

| | | | | |
|---|---|---|---|---|
| 2006/0274645 | A1* | 12/2006 | Bradford et al. | 370/216 |
| 2006/0274650 | A1* | 12/2006 | Tyagi | H04L 12/5695 370/229 |
| 2007/0053359 | A1 | 3/2007 | Wu et al. | |
| 2008/0304494 | A1* | 12/2008 | Yokoyama | H04W 48/02 370/400 |
| 2009/0310482 | A1* | 12/2009 | Asaie et al. | 370/225 |
| 2011/0063972 | A1* | 3/2011 | Muley et al. | 370/225 |

OTHER PUBLICATIONS

D-H Gan et al., "A Method for MPLS LSP Fast-Reroute Using RSVP Detours", Apr. 10, 2001, 12 pages.

L. Berger, "Generalized Multi-Protocol Label Switching (GMPLS) Signaling Resource Reservation Protocol-Traffic Engineering (RSVP-TE) Extensions", Network Working Group, 2003, 42 pages.

Papadimitriou, D., "Generalized Multi-Protocol Label Switching (GMPLS) Signaling Extensions for G. 709 Optical Transport Networks Control," Network Working Group, RFC 4328, Jan. 2006.

Berger, L., "Generalized Multi-protocol Label Switching (GMPLS) Signaling Resource Reservation Protocol-Traffic Engineering (RSVP-TE) Extensions," Network Working Group, RFC 3473, Jan. 2003.

Awduche, D., et al., "RSVP-TE: Extensions to RSVP for LSP Tunnels," Network Working Group, RFC 3209, Dec. 2001.

Mannie, E., "Generalized Multi-Protocol Label Switching (GMPLS) Architecture," Network Working Group, RFC 3945, Oct. 2004.

Berger, L., "Generalized Multi-Protocol Label Switching (GMPLS) Signaling Functional Description," Network Working Group, RFC 3471, Jan. 2003.

First Office Action issued by the State Intellectual Property Office, P.R. China for Patent Application No. 201180060713.1, Apr. 1, 2015.

* cited by examiner

MESSAGE PASSING TO ASSURE DELETION OF LABEL SWITCHED PATH

This application is the U.S. national phase of International Application No. PCT/EP2011/071477 filed 1 Dec. 2011 which designated the U.S. and claims priority to EP 10195188.7 filed 15 Dec. 2010, and U.S. Provisional Application No. 61/492,526 filed 2 Jun. 2011, the entire contents of each of which are hereby incorporated by reference.

TECHNICAL FIELD

This invention relates to nodes for communication networks being operable as ingress nodes to tear down label switched paths, to nodes operable as intermediate nodes or egress nodes, to methods of tearing down a label switched path through the network, and to corresponding computer programs.

BACKGROUND

Optical Transport Networks such as those specified in the ITU-T G.709 recommendation are known, having a control plane to control nodes of such networks to reserve (set up) new paths by sending messages between the nodes to reserve resources at each node.

Classical RSVP (Resource reSerVation Protocol) [RFC2205] signaling protocol is a known protocol for messages sent between nodes to set up new paths. RSVP-TE (RSVP-Traffic Engineering) [RFC3209] extends RSVP in order to provide a way to establish Label Switched Paths (LSPs) in MPLS (Multi-Protocol Label Switching). To reserve a path, an RSVP-TE (Traffic Engineering) PATH message, in the form of a Generalized Label Request, is sent out from the first node (which acts as an ingress node) via intermediate nodes along the proposed path, to the last node (acting as an egress node). The egress node returns an RSVP-TE RESV message to the ingress node, back along the path to cause the nodes along the path to confirm the reservation of resources such as bandwidth on switch paths and ports, for the requested path, for traffic of a signal type specified in the message.

It is non reliable in the sense that it relies on other mechanisms if a message is lost. It can recover from message lost via RSVP refresh messages. For example, if the sole tear down message transmitted is lost, then resources will only be deallocated once the "cleanup timer" interval has passed.

RSVP-TE does not change the intrinsic RSVP unreliability described above.

GMPLS (Generalized MPLS) [RFC3945] generalized the concept of LSP. An LSP became regarded as meaning "any possible form of connection which someone is willing to control". Again, GMPLS does not change the intrinsic RSVP unreliability aspect.

The concept of a distributed Control Plane architecture providing, among others, signaling functions to dynamically set up/tear down LSPs over an underlying data transport network, introduces flexibility in allocation of network resources. This leads to an optimized on-demand bandwidth usage, ensuring network efficiency and allowing for greater scalability of topology.

On the other hand, the lack of a centralized control plane entity able to "see" and control the whole network, requires that single NEs are able to exchange all the information needed to stay aligned with each other and to keep their view of the underlying data plane consistent and up to date.

A basic requirement to make this possible is that connectivity among nodes at the control plane layer is in place. In case of failures affecting connectivity among nodes, prompt recovery from possible misalignments that can arise is more difficult.

SUMMARY

An object of the invention is to provide improved apparatus or methods. According to a first aspect, the invention provides:

A node for a communication network having multiple nodes and operable as an ingress node to tear down a label switched path through the network of nodes. The node is arranged to receive a path error message from another node (NE3) along the path indicating a fault (NE4) along that path during tear down of that path, and to respond by sending a message by a different route, bypassing the indicated fault, to a further of the nodes (NE5, NE6) on that path beyond the indicated fault. The message notifies that further node (NE5, NE6) that the tear down should be continued for all the nodes (NE5) on that path beyond the indicated fault.

This helps enable the ingress node to clean up the rest of the path beyond the fault, to avoid leaving unused capacity unavailable for use, and to avoid or reduce time consuming manual clean up after an uncompleted tear down procedure Another aspect of the invention provides a node (NE5, NE6) for a communication network having multiple nodes and being operable as an intermediate node (NE5) or an egress node (NE6) to cooperate with another node (NE1) acting as an ingress node to tear down label switched paths through the network of nodes. The node is arranged to receive a message notifying of a tear down of a path, the message being received over a different route from the path, and notifying that the tear down should be carried out of a portion of that path beyond an indicated fault. The node responds by sending a further message along the portion of the path beyond the indicated fault, to indicate to other nodes (NE5) along the portion of the path that the path is to be torn down.

Another aspect of the invention provides a node (NE4) for a communication network having multiple nodes and operable as an intermediate node to cooperate with another node (NE1) acting as an ingress node to tear down a label switched path through the network of nodes. The node is arranged to recover from a fault during the tear down procedure, and to receive a message (7) from the ingress node notifying that the incomplete tear down should be completed, the message being received over a different route from the partly torn down path, and notifying that the tear down should be carried out at the node. The node completes the tear down at the node, and responds by returning an acknowledgement (8) to the ingress node that the tear down is completed at the node causing the fault in the tear down.

This has the effect of completing the clean up of the tear down to avoid leaving unused reserved capacity at the faulty node.

Another aspect of the invention provides a method of tearing down a label switched path through the network of nodes, the method having the following steps. A path error message is received at an ingress node of the path. The path error message is from another node along the path indicating a fault along that path during tear down of that path. In response to the path error message, an alert is sent using a different route bypassing the fault to alert a further one of the nodes (NE5, NE6) on that path beyond the indicated fault, to cause that further node to continue the tearing down for all the nodes on that path beyond the indicated fault. At the further node, in response to the alert, the tear down is continued by sending a further message along the portion of the path beyond the indicated fault, to indicate to other nodes along the portion of the path that the path is to be torn down.

Another aspect of the invention provides a corresponding program for controlling a node. Any additional features can be added to these aspects, or disclaimed from them, and some are described in more detail below. Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Definitions

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of node, not limited to the types described, not limited to any level of integration, or size or bandwidth or bit rate and so on.

References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

Some Abbreviations

GMPLS Generalized Multi Protocol Label Switching
IETF Internet Engineering Task Force
LSP Label Switched Path
NE Network Element
RFC Request For Comment
RSVP ReSource reserVation Protocol
RSVP-TE ReSource reserVation Protocol-Tunnel Extensions
FIG. 1, Conventional Sequence of Messages to Set Up an LSP By way of introduction to the embodiments, some issues with conventional designs will be explained.

Figure 1:
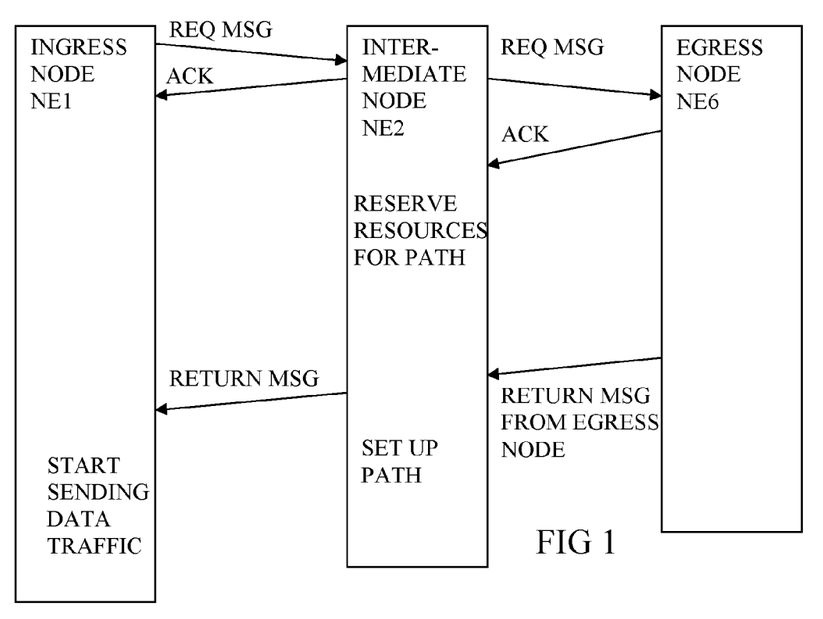
FIG. 1 shows a schematic view of a sequence of messages passed between nodes based on a conventional protocol.

FIG. 1 shows a schematic view of a sequence of messages passed between nodes based on a conventional protocol. The left hand block represents an ingress node NE1, the middle block represents one of many intermediate nodes NE2, and the right hand block represents an egress node NE6. A sequence of messages between the nodes is shown by arrows, with time flowing down the figure. A request message (such as an RSVP PATH message) is sent from the ingress node to the intermediate node along the path being set up. The intermediate node returns an acknowledgement message and passes the request message on to the next intermediate node and eventually to the egress node. The egress node sends a return message (such as an RSVP RESV message) back along the path to cause the nodes to use the reserved resources to set up the path. Each node responds to the return message to set up the path and pass the message along the path until it reaches the ingress node. The ingress node now knows the path is set up and can start sending data traffic along the path.

Examples of control planes can use Generalized Multi-Protocol Label Switching (GMPLS), which extends MPLS from supporting Packet Switching Capable (PSC) interfaces and switching to include support of four new classes of interfaces and switching: Layer-2 Switching (L2SC), Time-Division Multiplex (TDM), Lambda Switch (LSC), and Fiber-Switch (FSC) Capable.

A functional description of the extensions to MPLS signaling that are needed to support these classes of interfaces and switching is provided in RFC3471, while RFC3473 describes the ReSource reserVation Protocol (RSVP-TE) specific formats and mechanisms needed to support all four classes of interfaces. RFC 4328 presents the technology details that are specific to G.709 Optical Transport Networks (OTN). Such parameters are carried through the signaling protocol in dedicated traffic parameter objects. Moreover RFC 4328 defines how to encode such labels when these G.709 traffic parameters are used. G.709 defines several networking layers constituting the optical transport hierarchy. RFC 4328 adapts GMPLS to control G.709 type OTNs, creating a Digital Path layer, an Optical Path layer and a label space structure enabling the identification of the exact position of a particular signal in a multiplexing structure. Thus, the GMPLS signaling extensions for G.709 need to cover the messages such as Generalized Label Requests, used to request capacity at nodes along the path as well as the specific technology dependent objects included in the so-called traffic parameters for SONET/SDH networks. Moreover, RFC 4328 also proposes a label space definition suitable for that purpose.

The Generalized Label Request is a message used by RSVP-TE for the signaling of a Label Switched Path (LSPs) on any kind of network technology. It is defined in RFC3471 and extended in RFC 4328 in order to support G.709 OTN architecture. It includes a common part (i.e., used for any switching technology) and a technology dependent part (i.e., the traffic parameters). RFC 4328 extends both parts to accommodate GMPLS Signaling to the G.709 transport plane recommendation.

Figure 2:
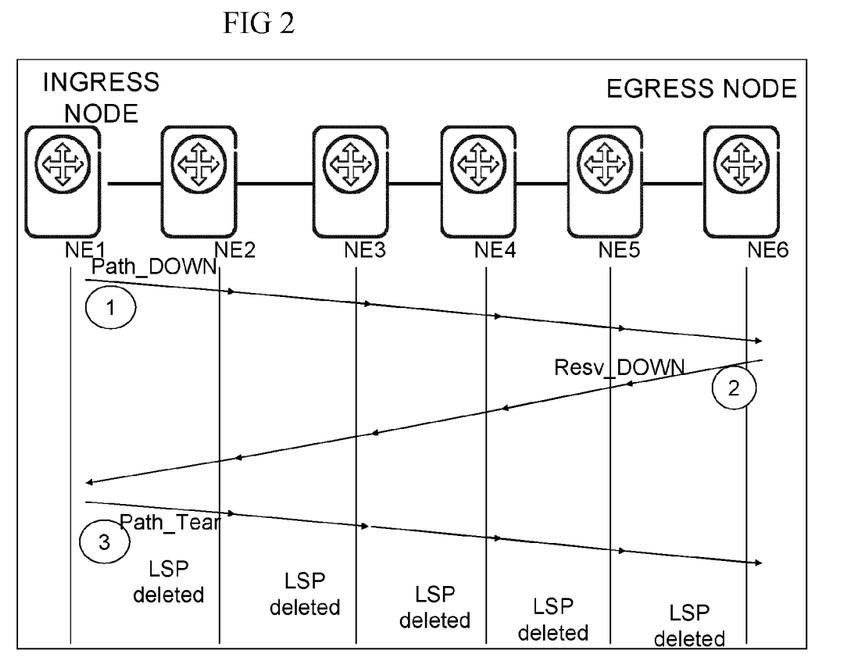
FIG. 2 shows a time chart of a conventional LSP deletion procedure.

FIG. 2—Conventional LSP Deletion Procedure

In this section a general overview of a conventional deletion procedure is given. As a reference for the discussion, a network having a number of nodes NE1 to NE6 within a GMPLS domain is considered.

A path in the form of a circuit LSP A, is set up from NE 1 to NE 6 through NEs 2, 3, 4 and 5, using RSVP-TE and is managed by a control plane distributed across the nodes.

The actual LSP tear down mechanism, in accordance with [RFC3473] Generalized Multi-Protocol Label Switching (GMPLS) Signaling Resource ReserVation Protocol-Traffic Engineering (RSVP-TE) Extensions, L. Berger et al., January 2003, Section 7.2.1, foresees sending an RSVP-TE Path message in the downstream direction (from NE1 to NE6) and a RSVP-TE Resv message in the upstream direction (as a reply to the Path message) with dedicated bits set (bit A and bit D, meaning that the LSP is going to be torn down) in the administrative Status object of each message. After the Resv message has reached the ingress node, the deletion procedure is completed sending a third type of message, Path Tear, from ingress to egress.

In this and other figures, message names Path_Down and Resv_Down are used for the corresponding Path and Resv messages carrying an Administrative Status object with A and D flags set. In FIG. 2, various messages are labeled (1) to (3).

The deletion of the LSP is initiated by ingress node NE1 sending a Path_Down (1) to the neighboring node, which in turn forwards it towards Egress node NE6 along the LSP path. NE 6 replies with a Resv_Down (2), which is forwarded in a similar way but in the opposite direction up to NE 1. Then, the ingress NE 1 terminates the LSP deletion by sending a Path Tear message downstream (3). LSP A is actually deleted from an NE only when the final Path Tear message is received and processed.

During such deletion procedure, an issue arises if one or more NEs along the LSP don't respond to the first signaling flow, that is the Path_Down(R) flow (Path_Down with flag R set, meaning that a Resv_Down is requested). In other words the problem comes out when a node NE, which is not reacting for some reason to control plane messages, blocks the Path_Down(R) messages which are supposed to be transmitted toward the Egress NE.

In such a situation, a number of NEs from the Ingress one down to the blocking node have received a Path_Down(R), the other ones don't. The first group of NEs, even without receiving other messages, is still able to delete the LSP and free related resources within a given timeframe (by means of an internal timer or generating a Path Error upstream with PSR flag set). On the other hand, NEs that are placed downstream with respect to the blocking node retain the normal state corresponding to LSP up. Those downstream nodes hold quietly the LSP and associated resources, as they don't have any advice of LSP deletion.

Summarizing, if during a deletion procedure initiated by ingress, one or more blocking nodes exist, they create a barrier for the nodes along the path downstream, beyond the blocking node, making them unable to get aligned with upstream ones' LSP status. This represents a problem as it introduces a resource consuming misalignment in the nodes involved and hence in the whole network.

A quite similar scenario can be drawn when considering a LSP deletion initiated by egress node. In this case the only change is that proper deletion messages flow applies according to [RFC3473], but the basic issue introduced by blocking node(s) still remains.

Introduction to Features of Embodiments of the Invention

In order to overcome the LSP deletion issues arising in case of blocking node(s) scenario outlined in previous section, a Safe Deletion Procedure is introduced here. This procedure can be seen as an enhancement to the usual deletion messages flow and mechanism, taking place only when blocking nodes issue comes out. In at least some embodiments, there is no need to modify in any way the core of what specified in [RFC3473] but, when needed, a further message exchange is added, based on for example Notify messages, at the end of a normal deletion. Its focus is on ensuring a way to clean-up nodes from LSP segments, which are left hanging on after an incomplete deletion as described above.

In some embodiments, this can be implemented by extensions to existing RSVP-TE (ReSource reserVation Protocol-Traffic Engineering) signaling protocol [RFC3473] of the GMPLS protocol suite. Such extensions can help guarantee deletion of an LSP (Label Switched Path) in case any of the Networks Elements (NEs) along its path are not able to receive the LSP tear down message.

This procedure is particularly useful in cases where the "hard state approach is used" (i.e. an LSP is not automatically deleted if no Refresh message is received periodically) or in cases where the Refresh Timeout is set to very long value. In the former case the unsuccessful deletion of the LSP (or part of it) causes the permanent unavailability of involved resources, while in the second one long term unavailability.

The "Safe Deletion" procedure here introduced ensures that an LSP deletion is performed in a reliable and clean way even if one or a set of nodes involved in it is temporarily isolated from receiving/sending control plane messages.

Figure 3:
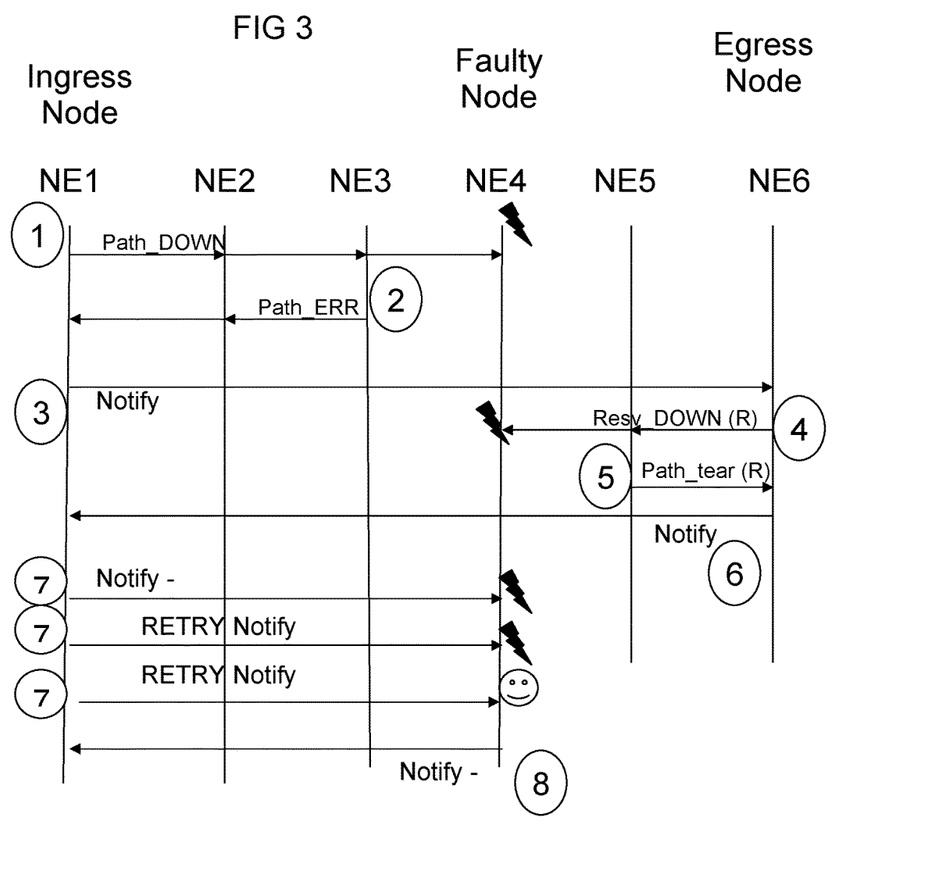
FIG. 3 shows a time chart of a deletion procedure according to an embodiment.

FIG. 3—Safe Deletion Procedure

In FIG. 3 shows a time chart with time flowing down the page, illustrating an example of the added "Safe Deletion" message flow to be used in order to solve the problem of LSP status misalignment. In this figure, it is ingress initiated, though a similar example initiated by the egress node can be envisaged. The ingress node for the LSP A under deletion is NE1 and its egress node is NE6. NE 4 has become isolated from the other nodes (i.e. it is disconnected at control plane level, or it is in a faulty state or whatever makes it unable to react to signaling in a proper way).

The event sequence shown is as follows, with messages labeled 1 to 8:
1. NE 1 starts the deletion procedure from ingress sending a Path_Down(R) message for the LSP A;
2. NE 2 forwards the Path_Down(R) down to NE 3, which in turn tries to send the Path_Down(R) to NE 4. The communication fails due to the disconnection of NE 4 from the Control Plane. NE 3 sends back in the upstream direction a Path_Err with Path State Removed flag set informing Ingress node about the failure that occurred;

3. Upon reception of this Path_Err, upstream nodes between the blocking and the Ingress NE clean up internally LSP A tracks and free the related resources. When Ingress node receives that Path Err, it starts the "Safe Deletion" procedure by sending a Notify message directly to the Egress NE, making it aware that an ingress initiated deletion procedure for LSP A has failed. Please note that the notify message does not follow LSP A path but can be routed from NE1 to NE6 through any path avoiding NE4.
4. Egress NE, reacts to Notify message 3 by trying to perform LSP A deletion from its side. This is done by sending a Resv_Down(R) message upstream towards the ingress. If this direction is not affected by control plane fault and the deletion from egress is terminated correctly, LSP A is properly removed from every node and the deletion ends. In the example shown in FIG. 3, the control plane network is interrupted at NE 4.
5. NE5 returns a Resv_Err with Path State Removed, which is passed node by node towards the Egress NE, with a proper Error Code. The LSP is now deleted also from the node downstream with respect to the blocking node.
6. Then Egress NE sends a Notify Message to Ingress, indicating that the deletion procedure has failed from Egress as well.
7. Ingress NE at this point knows:
a. the path of the LSP (NE1-NE2-NE3-NE4-NE5-NE6)
b. that he was able delete the LSP up to NE3 (NE1-NE2-NE3)
c. from the Notify received from Egress that the LSP has been deleted up to NE5 (NE5-NE6).

By correlating such pieces of information, the ingress node is now able to determine that only NE4 is missing (in general it is able to determine the list of nodes creating a barrier for control plane messages in both ways). The ingress node then sends a Notify message 7 to the isolated node NE 4 and keeps on sending it at timed intervals (an exponential back-off timer could be used).

8. As soon as NE4 becomes reachable again, it is ready to receive and process the closest delete Notify message sent from Ingress. It deletes the LSP and replies to Ingress NE acknowledging the command. In order to optimize the time that a formerly isolated node takes, waiting to receive first good Delete Notify sent by ingress after its resurrection, a tell back mechanism could be implemented. Such a mechanism makes the ingress aware of the precise time when the disconnected nodes become connected again at control plane level. In such a way it is possible for the ingress to override the period between a Delete Notify and the next, which would be determined otherwise in a defined way (exp backoff). Ingress NE, upon receiving the Ack from formerly isolated node, ends the safe deletion procedure instance related to that node.

Each message has a field called TYPE which is used to identify the type of message being sent (path, resv, path tear, path err, notify, etc). There is no need for any modification of the standard PATH and RESV message formats. The PATH and RESV messages include an object called an admin status object with a set of flags. The consequent actions to be performed upon receiving a message are usually indicated by those flags. The only procedure standardised for LSP deletion is the one with the A and D flags, there is no other way of doing it using RSVP-TE. It would be possible to use different types and formats of messages, but that wouldn't be compatible with the GMPLS standards.

In case of the NOTIFY message, some information indicating the purpose of the notification can be carried within the "Value" field of the messages. Some values have already been defined, and others have been left undefined, for future use. If the undefined values start for example at 38, then new values could be defined such as for example:
38—notify message 3 of FIG. 3, to start tear down beyond the fault,
39—notify message 6 to inform ingress NE that tear down beyond the fault completed,
40—notify message 7 to get faulty node to tear down
41—notify message 8 to inform ingress NE that faulty node has completed tear down.

Effects of Some Features

Procedures and protocols illustrated here can improve the network usability by avoiding network fragmentation and under usage of resources. These improvements can help to keep the Total Cost of Ownership of the network low. Such procedure can be applied to any kind of network architecture controlled by a GMPLS control plane.

Figure 4:
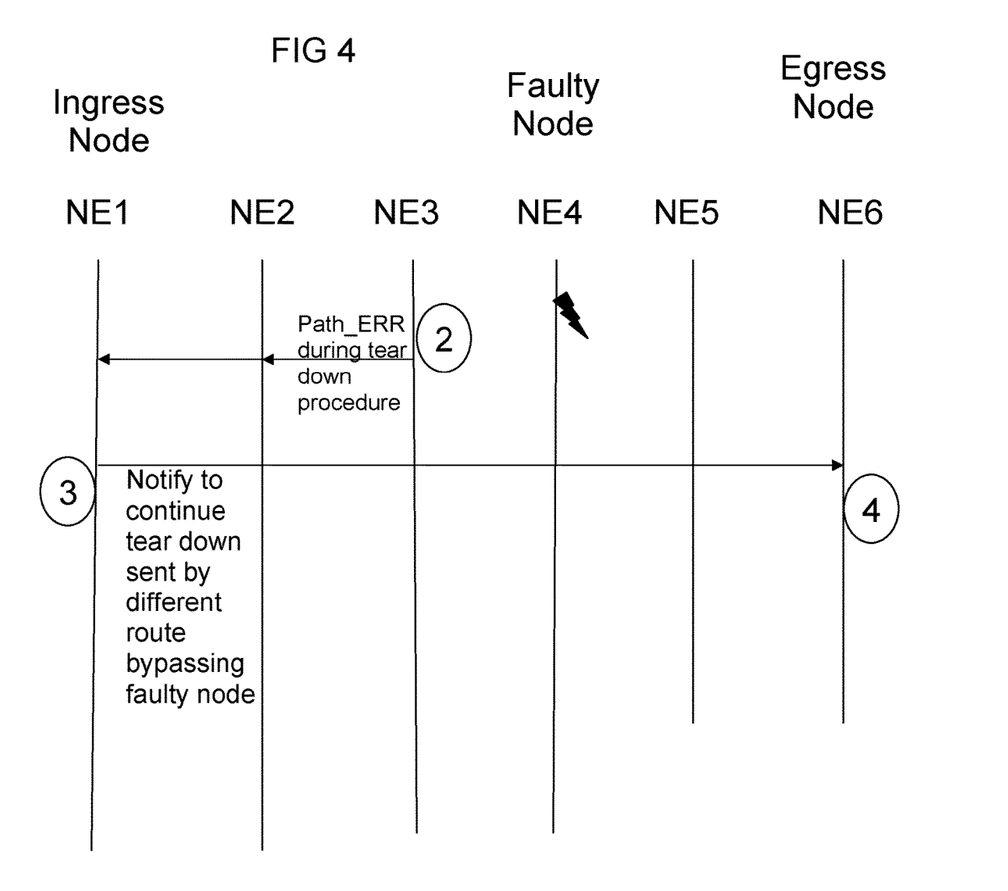
FIGS. 4 to 9 show time charts of examples of parts of the procedure according to embodiments.
Figure 5:
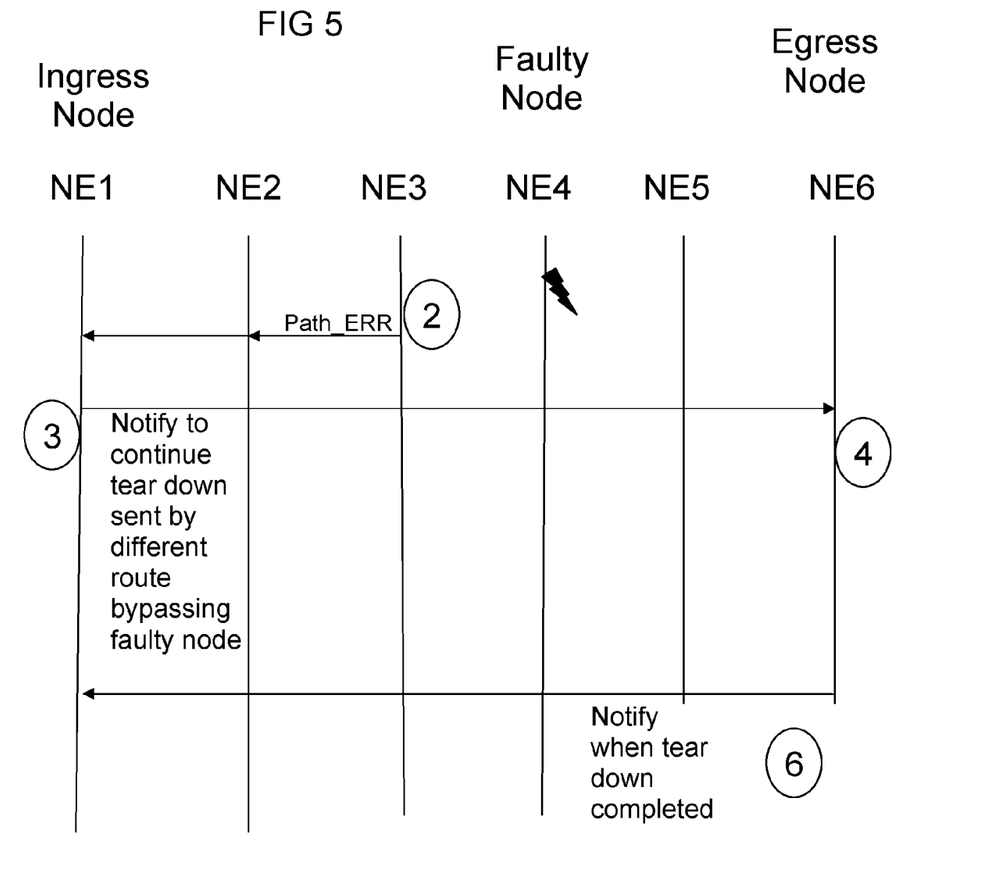

FIGS. 4, 5 Actions of Ingress Node

In FIG. 4, a similar time chart is shown, showing steps involving messages 2 and 3 from the point of view of the ingress node. At first, a message is received during a tear down procedure as set out above, or of any other kind. The message can be a path error message (2). The ingress node then responds by sending a message (3) to another node NE6 along the path beyond the source of the path error, using a notify message. This indicates to the further node that the tear down is to be continued, and is sent by a different route bypassing the faulty node. In principle, the further node can be any of the nodes beyond the fault, though if compatibility with existing standards is to be maintained, then the further node should be the egress node.

FIG. 5 shows a similar time chart. Optionally the ingress node can expect an acknowledge message from the further node when the tear down of the path is completed for all nodes beyond the fault. This is shown by message 6 in FIG. 5. The actions of the egress node and other nodes are not shown to indicate that they can be either as in FIG. 3 or can use other steps the ingress node need not be aware of.

Figure 6:
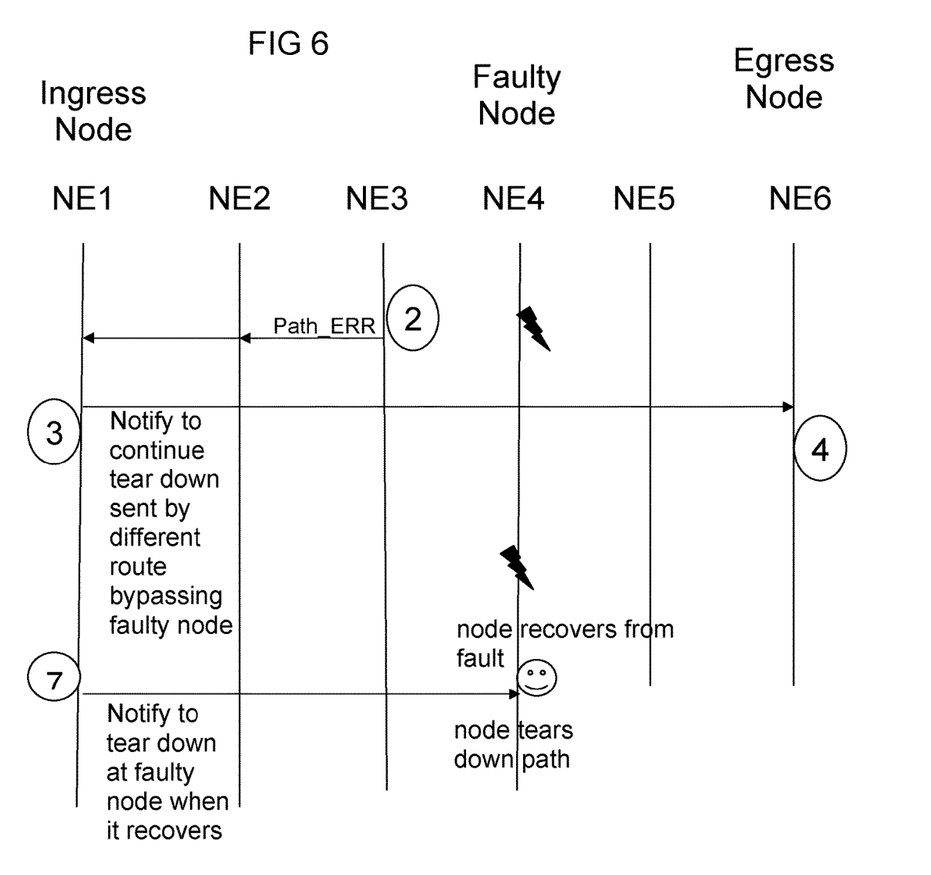

FIG. 6, Clean Up of Faulty Node

FIG. 6 shows a similar time chart. In this case the faulty node recovers and the ingress node sends a notify message (7) to the faulty node after the ingress node has sent message (3). This can prompt the previously faulty node to tear down its part of the path. Again, actions of the egress node and other nodes are not shown to indicate that they can be either as in FIG. 3 or can use other steps the ingress node need not be aware of.

Figure 7:
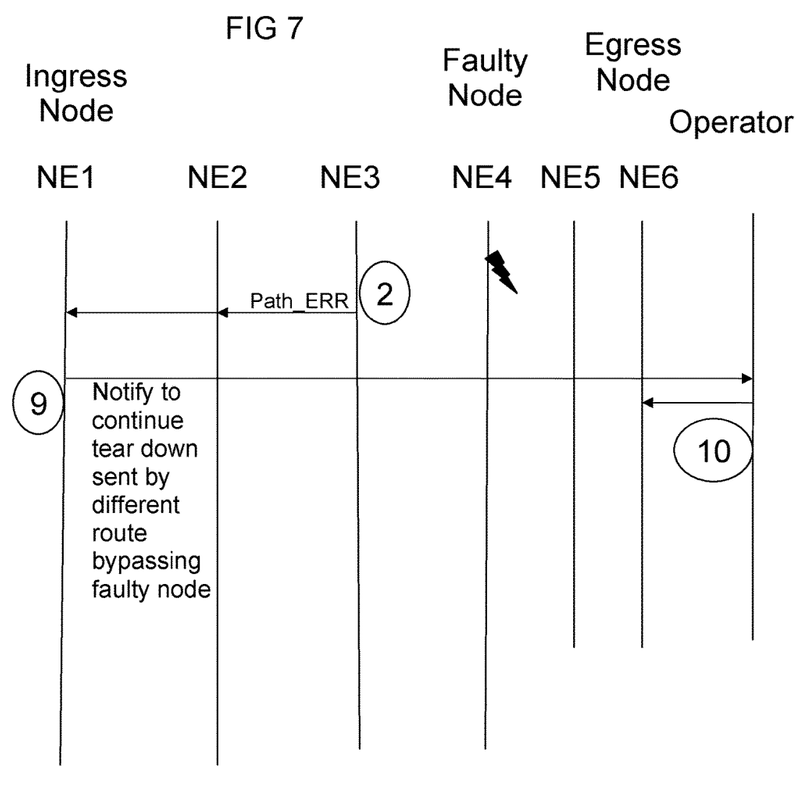

FIG. 7, Notify Via Operator

In FIG. 7, a similar time chart is shown, showing steps involving messages 2 and 3 from the point of view of the ingress node. It differs from FIG. 4 in that the different route bypassing the faulty node is via an operator. At first, a message is received during a tear down procedure as set out above, or of any other kind. The message can be a path error message (2). The ingress node then responds by sending a message (9) to the operator using a notify message. This indicates that the ingress node has received an error message and that the tear down is to be continued beyond the fault. The operator can then send a message (10) directly to another node NE6 along the path beyond the source of the path error, so as to bypass the faulty node. This message can prompt the other node NE6 (or conceivably any other node beyond the faulty node), to continue the tear down procedure.

Figure 8:
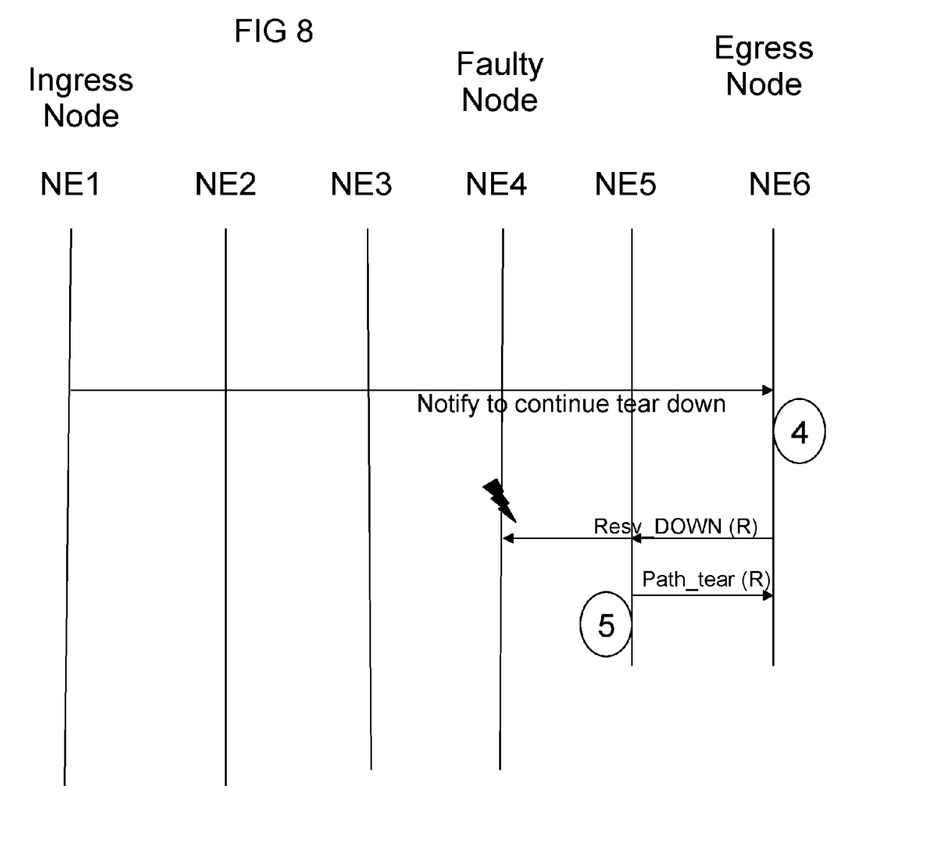

FIG. 8, Egress Node Actions

In FIG. 8, a similar time chart is shown, showing steps involving messages 4 and 5 from the point of view of the egress node. The actions of the ingress node and other nodes are not shown to indicate that they can be either as in FIG. 3 or can use other steps the egress node need not be aware of.

At first, a notify message is received during a tear down procedure as set out above, or of any other kind. The message (4) indicates to the egress node that the tear down is to be continued, and is sent by a different route bypassing the faulty node (NE4). The egress node responds by sending a RESV message back along the path towards the faulty node. Each node passes this message on and tears down its part of the path, thus freeing up capacity for future allocation to other paths. When the node (NE5) before the faulty node fails to pass the message to the faulty node, it sends back a PATH message along the path to the egress node. When this reaches the egress node, it knows the path tear down was successful up to the faulty node. If this message is not received at the egress node, the egress node can assume that another fault has occurred and can take further action or send an alert to an operator for example.

Figure 9:
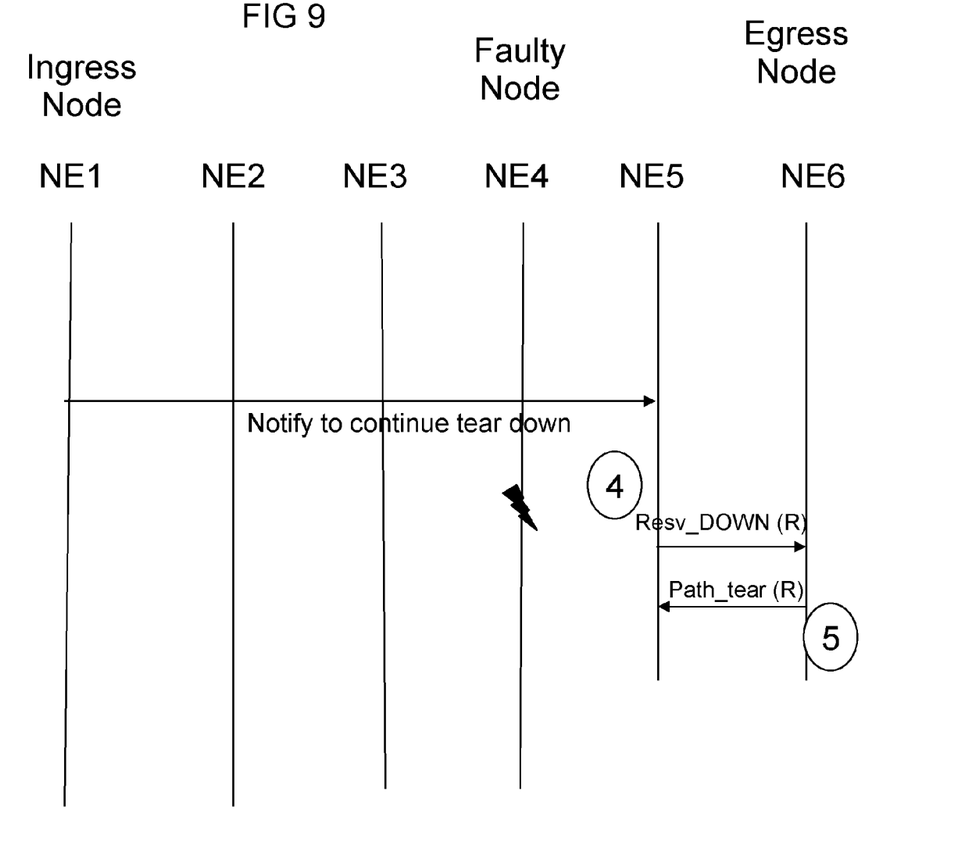

FIG. 9, Intermediate Node Controls Clean Up

In FIG. 9, a similar time chart is shown, to that of FIG. 8, but showing an example where the notify message to continue the tear down is received at an intermediate node (NE5), to indicate to the intermediate node that the tear down is to be continued. The intermediate node responds by sending the RESV message (4) along the path towards the egress node. Each node passes this message on and tears down its part of the path, thus freeing up capacity for future allocation to other paths. When the message reaches the egress node, it sends back a PATH message (5) along the path to the intermediate node. When this reaches the intermediate node, it knows the path tear down was successful. Using the intermediate node to control this clean up can achieve the same effect as using the egress node in principle, though it is less compatible with existing standards, so more changes would need to be made to each of the nodes.

Figure 10:
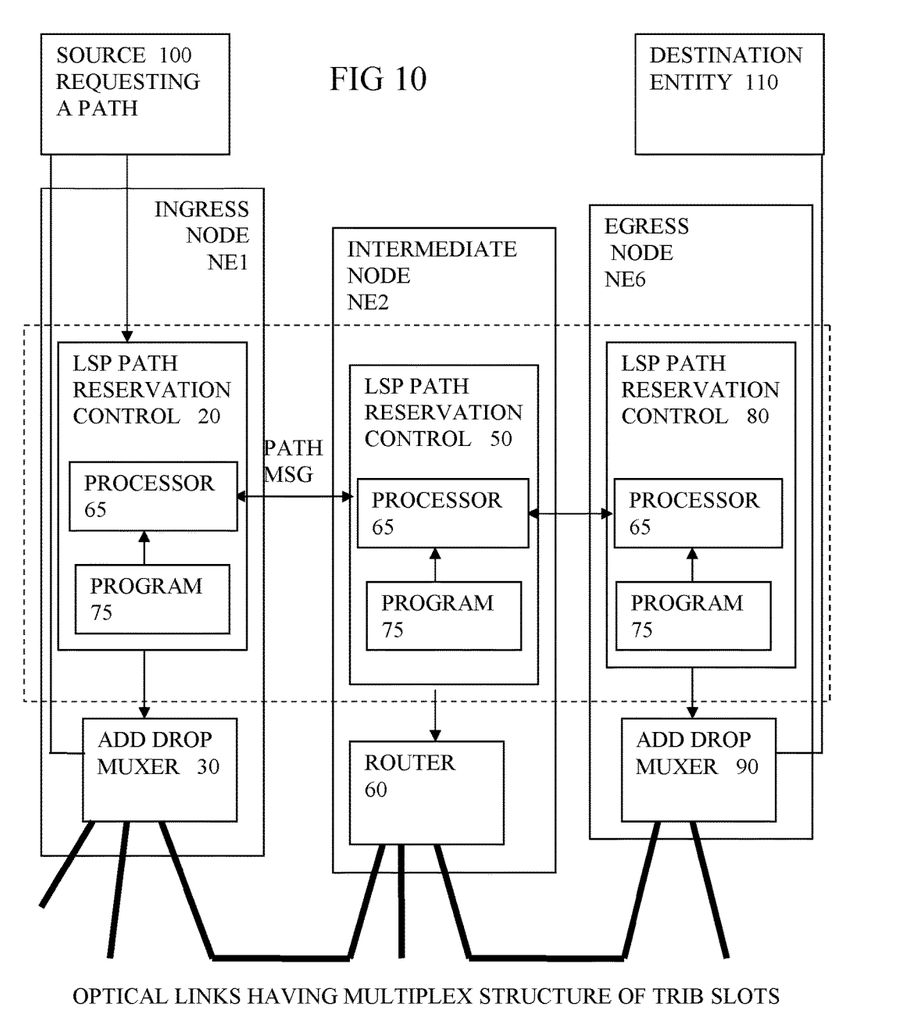
FIG. 10 shows an example of nodes which can implement the procedures of FIG. 3 to 9, or other embodiments.

FIG. 10, Overall View of Nodes According to Embodiments

FIG. 10 shows parts of an optical transport network suitable for carrying out the message passing described above. Three nodes are shown, there can be many more. An ingress node NE1 has an LSP path reservation control part 20, which controls an add drop multiplexer part 30. The reservation control part can have a processor 65 and a store having a program 75 for execution by the processor 65. The program can enable the node to act as an ingress node, or in some cases, to act as an intermediate node for other paths started elsewhere. An intermediate node NE2 has its own LSP path reservation control part 50, which controls a router 60. Again, the reservation control part can have a processor 65 and a store having a program 75 for execution by the processor 65. The program can enable the node to act as an intermediate node. If the intermediate node had add drop capabilities, then the program could be chosen to make the node act as an ingress or egress node for other paths. An egress node NE6 has its own LSP path reservation control part 80, which controls it's add/drop multiplexer 90. Again, the reservation control part can have a processor 65 and a store having a program 75 for execution by the processor 65. The program can enable the node to act as an egress node for the path shown, or as an ingress or intermediate node for other paths. A source entity 100 is shown, as a source of the traffic for which the new path is needed, through the network to a destination entity 110.

Optical links are shown for carrying the traffic between the nodes, and a connection is shown between the control parts of the nodes for passing messages to reserve and to tear down the path. This connection can in principle use either the same or different physical links to those used by the traffic between nodes. The optical links for the traffic can have a multiplex structure of trib slots. A path can use one or more of these trib slots, and a reservation procedure needs to indicate which of these trib slots is reserved.

Summary of Additional Features

As has been described, a label switched path through a network of nodes, is torn down by sending a message along the path from an ingress node. If there is a fault along the path, a path error message (2) is sent back along the path to the ingress node. The ingress node uses a different route bypassing the fault to alert (3) a further one of the nodes (NE5, NE6) on that path beyond the indicated fault, to cause that further node to continue the tearing down for other nodes on that path beyond the indicated fault by sending a further message (4) along the portion of the path beyond the indicated fault, to indicate to the other nodes to continue the tear down. This enables the ingress node to clean up the rest of the path beyond the fault, to avoid leaving unused capacity unavailable for reuse, and to avoid time consuming manual clean up.

The further of the nodes on that path can be an egress node (NE6) of the path. This is more compatible with existing tear down procedure than using intermediate node beyond the fault.

The node can receive an acknowledgement message (6) from the further node notifying that the tear down has been completed for the nodes beyond the indicated fault. This can enable the ingress node to monitor and control the clean up.

The node can be arranged to send a message (7) to a node (NE4) indicated as causing the fault on the path, bypassing other nodes along the path, to cause the faulty node to carry out the tear down of that path at the faulty node. This can help to complete the clean up to free up more resources.

The different route can be via a network operator, and the node can be arranged to send (9) the notifying message to the network operator, to enable the network operator to control manually (10) the continuing of the tear down beyond the indicated fault. This can enable more operator control of the network, to help reduce risk of unpredictable consequences of more complete automation.

The node can be arranged to initiate the tear down by sending a path message (1) along the path indicating that the path is to be torn down, before awaiting the path error message. This can makes use of part of an existing tear down protocol.

The notifying message can be an RSVP-TE signaling protocol notify message. Again this makes use of existing protocols.

The node acting as the egress node can be arranged to await a message (5) passed along the path indicating that the other nodes along the portion of the path have completed the tear down, and in response to that message, send an acknowledgement (6) to the node acting as the ingress node, by a route bypassing the indicated fault on the path.

The tear down can be completed at the faulty node without passing the message all the way along the partly torn down path. It can be more robust to handle the faulty node separately than the alternative possibility of continuing the tear down from the faulty node to the nodes beyond the fault.

The ingress node can be arranged to prompt a network operator, so that the network operator can manually alert the further node.

Another aspect of the invention provides a method of tearing down a label switched path, using a node operating as an ingress node for the path through the network of nodes, the method having the step of receiving a path error message from another node (NE3) along the path indicating a fault (NE4) along that path during tear down of that path, and responding by sending a message by a different route, bypassing the indicated fault, to a further of the nodes (NE5, NE6) on that path beyond the indicated fault, the message notifying that further node (NE5, NE6) that the tear down should be continued for all the nodes (NE5) on that path beyond the indicated fault.

Another aspect of the invention provides a method of tearing down a path using a node (NE5, NE6) operable as an intermediate node (NE5) or an egress node (NE6) to cooperate with another node (NE1) acting as an ingress node to tear down label switched paths through the network of nodes. A message is received notifying of a tear down of a path, the message being received over a different route from the path, and notifying that the tear down should be carried out of a portion of that path beyond an indicated fault. In response, a further message is sent along the portion of the path beyond the indicated fault, to indicate to other nodes (NE5) along the portion of the path that the path is to be torn down.

Another aspect of the invention provides a method of tearing down a path using a node (NE4) for a communication network having multiple nodes and operable as an intermediate node to cooperate with another node (NE1) acting as an ingress node to tear down a label switched path through the network of nodes. In the case that the node has a fault during the tear down procedure, the node recovers from the fault and receives a message (7) from the ingress node notifying that the incomplete tear down should be completed, the message being received over a different route from the partly torn down path, and notifying that the tear down should be carried out at the node. The tear down at the node is completed, and an acknowledgement (8) is returned to the ingress node that the tear down is completed at the node causing the fault in the tear down.

Other variations and embodiments can be envisaged within the claims.

The invention claimed is:

1. A node for a communication network having multiple nodes,
the node comprising a processor, the node being operable as an ingress node to tear down a label switched path through the network of nodes,
the node being arranged to receive a path error message from another node along the path indicating a fault along that path during tear down of that path, and
the node being arranged to respond by sending a message by a different route, bypassing the indicated fault, to a further of the nodes on that path beyond the indicated fault, the message notifying that further node that the tear down should be continued for all the nodes on that path between the further node and the ingress node;
the node being arranged to receive an acknowledgement message from the further node notifying that the tear down has been completed for the nodes beyond the indicated fault; and
the node being arranged to determine, using the received path error message and the acknowledgment message, a node indicated as causing the fault on the path.

2. The node of claim 1, the further of the nodes on that path being an egress node of the path.

3. The node of claim 1, arranged to send a message to the node indicated as causing the fault on the path, bypassing other nodes along the path, to cause the faulty node to carry out the tear down of that path at the faulty node.

4. The node of claim 1, the different route being via a network operator, and the node being arranged to send the notifying message to the network operator, to enable the network operator to control manually the continuing of the tear down beyond the indicated fault.

5. The node of claim 1, being arranged to initiate the tear down by sending a path message along the path indicating that the path is to be torn down, before awaiting the path error message.

6. The node of claim 1, the notifying message being an RSVP-TE signaling protocol notify message.

7. A node for a communication network having multiple nodes,
the node comprising a processor, the node being operable as an egress node to cooperate with another node acting as an ingress node to tear down label switched paths through the network of nodes,
the node being arranged to receive a message from the ingress node notifying of a tear down of a path, the message being received over a different route from the path, notifying that the tear down should be carried out between the node and the ingress node, and
the node being arranged to respond by sending a further message upstream to other nodes along the portion of the path, to indicate to the other nodes along the portion of the path that the path is to be torn down;
the node being arranged to await a message passed along the path indicating that the other nodes along the portion of the path have completed the tear down, and in response to that message, to send an acknowledgement to the node acting as the ingress node, by a route bypassing an indicated fault on the path.

8. The node of claim 7, the further message being an RSVP-TE RESV message.

9. A node for a communication network having multiple nodes,
the node comprising a processor, the node being operable as an intermediate node to cooperate with another node acting as an ingress node to tear down a label switched path through the network of nodes,
the node being arranged to recover from a fault during the tear down procedure, the node also being arranged to receive a message from the ingress node notifying that the incomplete tear down should be completed, the message being received over a different route from the partly torn down path, and notifying that the tear down should be carried out at the node, and
the node being arranged to complete the tear down at the node, and to respond by returning an acknowledgement to the ingress node that the tear down is completed at the node causing the fault in the tear down.

10. The node of claim 9, arranged to complete the tear down at the node without passing the message all the way along the partly torn down path.

11. A method of using a communication network having multiple nodes to tear down a label switched path through the network of nodes, wherein each node in the network of nodes comprises a processor, the method having the steps of:
receiving at an ingress node of the path, a path error message from another node along the path indicating a fault along that path during tear down of that path,
in response to the path error message, using a different route bypassing the fault to alert a further one of the nodes on that path beyond the indicated fault, to cause that further node to continue the tearing down for all the nodes on that path between the further node and the ingress node, and at the further node, in response to the alert, continuing the tear down, by sending a further message upstream to other nodes along the portion of the path beyond the indicated fault, to indicate to the other nodes along the portion of the path that the path is to be torn down;

receiving, at the ingress node, an acknowledgement message from the further node notifying that the tear down has been completed for the nodes beyond the indicated fault; and determining, at the ingress node, a node indicated as causing the fault on the path using the received path error message and the acknowledgment message.

12. The method of claim 11, the alerting step involving the ingress node prompting a network operator, and the network operator manually alerting the further node.

13. A non-transitory computer readable medium having instructions stored in non transitory for which when executed by a computer cause the computer to control a node for a communication network having multiple nodes, wherein each node in the network of nodes comprises a processor, to operate the node as an ingress node to tear down a label switched path through the network of nodes, to control the node to receive a path error message from another node along the path indicating a fault along that path during tear down of that path, to control the node to respond by sending a message by a different route, bypassing the indicated fault, to a further of the nodes on that path beyond the indicated fault, the message notifying that further node that the tear down should be continued for all the nodes on that path between the further node and the ingress node;

to control the node to receive an acknowledgement message from the further node notifying that the tear down has been completed for the nodes beyond the indicated fault; and to control the node to determine, using the received path error message and the acknowledgment message, a node indicated as causing the fault on the path.

\* \* \* \* \*